United States Patent Office 3,434,503
Patented Mar. 25, 1969

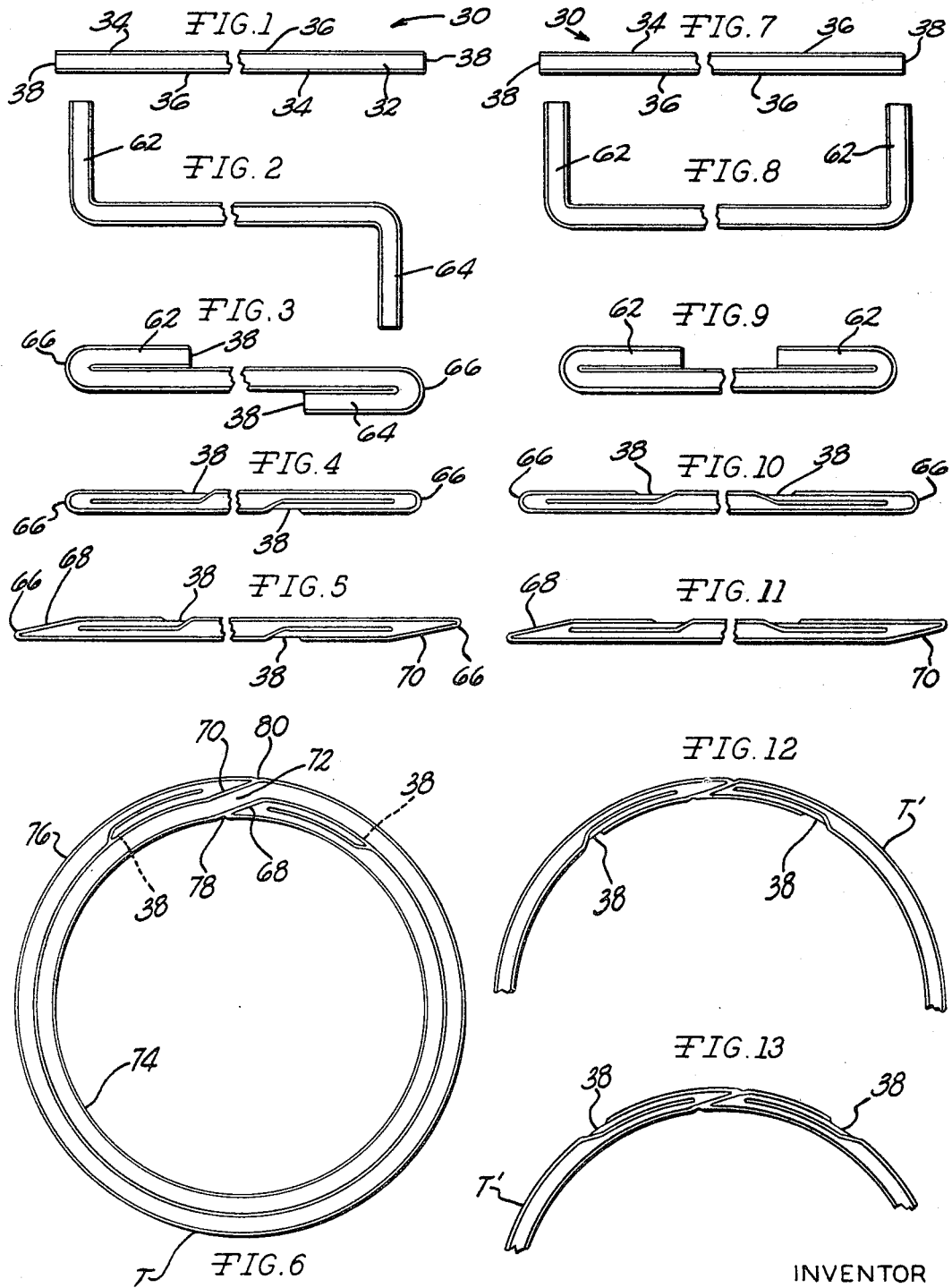

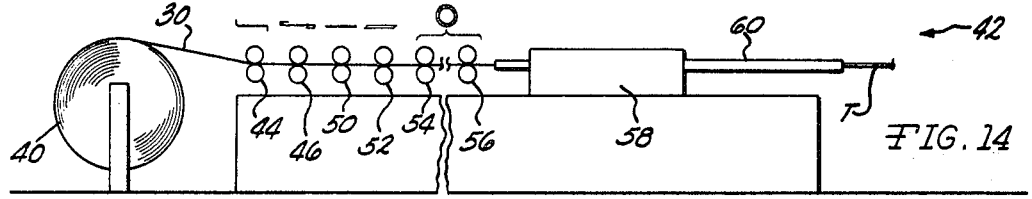
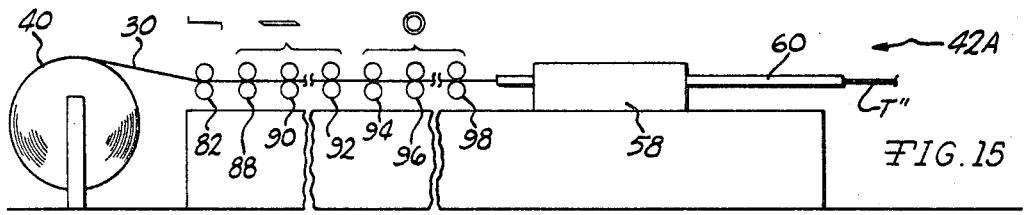
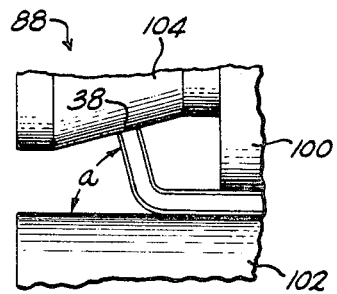
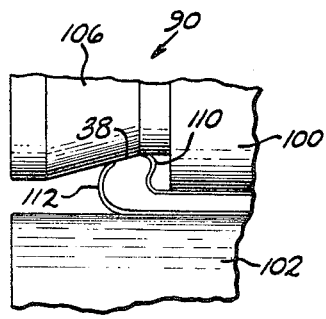
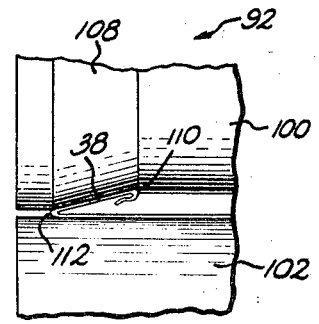
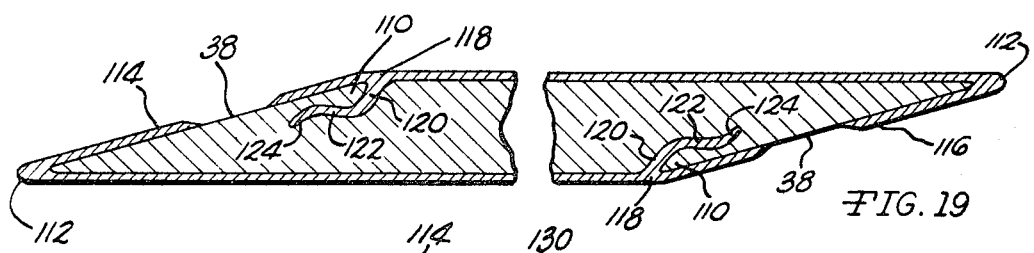
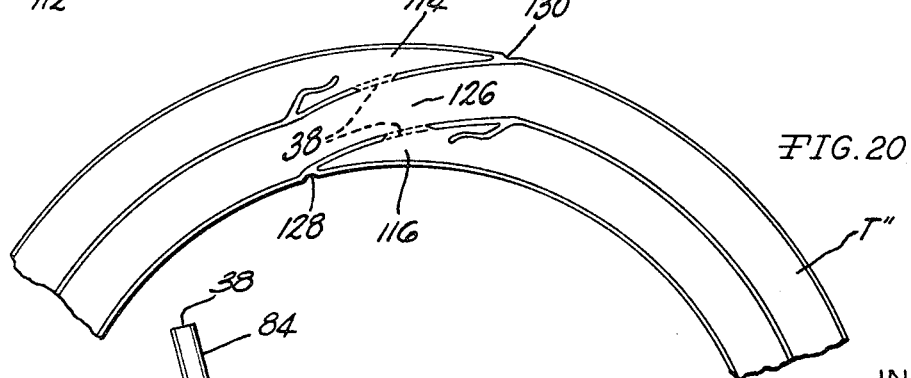

3,434,503
METHOD OF MAKING TUBING AND
PRODUCT THEREOF
David R. Knox, Huntington Woods, Mich., assignor to
Bundy Corporation, a corporation of Michigan
Filed Oct. 12, 1966, Ser. No. 586,086
Int. Cl. F16l 9/18; B23k 31/06
U.S. Cl. 138—171                48 Claims

ABSTRACT OF THE DISCLOSURE

This invention relates to the manufacture of tubing from a sheet of corrosion-prone metal base having layers of corrosion-resistant metal on its faces by bending the edges of the sheet back upon the sheet with a thickness after folding equal to that of the original sheet, providing a taper to the folded edges, coiling the sheet to tube form and applying heat to melt the layer, which has a lower melting than the corrosion-prone base, at least at the folded ends to secure the sheet edges in place and form the tube, and the tubing produced thereby.

---

This invention relates generally to tubing made from flat strip metal stock which is provided with a coating of bonding metal. The strip is fashioned laterally to tubular form in which portions of the strip interengage. The tube is then heated to cause a fused metal connection to form between the interfacing portions. Typically, the substrate metal comprises a ferrous metal such as steel, and the bonding metal comprises copper. Woeller 2,292,810 and Mally et al. 2,998,047 disclose in more detail methods and apparatus for making tubing in this manner.

Literally millions of miles of commercially satisfactory tubing of this type have been made and sold to industry. Such tubing is much less expensive than tubing made entirely from corrosion-resistant metals such as copper or Monel and has the further advantage of possessing the structural strength of steel. This type of tubing also has the advantage over welded tubing in that the seam, both inside and out, is smooth and clean and requires no scarfing.

Nevertheless, this type of tubing is subject to attack by corrosive environments for two reasons. First, in order to obtain a thorough bonding during the heating step, the coating of bonding metal is kept so thin that its protection against corrosion is relatively scant. Second, the strip stock is made commercially by coating or cladding relatively wide bands of steel with the copper. The bands are then slit longitudinally to the desired width. This leaves the edge faces of the steel exposed and subject to corrosion. Consequently, the seam areas of the tube are particularly corrosion prone.

In the past, the corrosion resistance of this type of tubing has been somewhat improved by coating it with a corrosion-resistant metal such as a tin alloy or with a plastic material. However, neither of these coatings, even though they add materially to the cost of the tubing, has provided entirely satisfactory corrosion protection where the tubing is subjected more or less continually to a corrosive environment, as in the case of vehicle air brake lines, room air-conditioning condensers, domestic plumbing systems, and the like.

The general object of this invention is to provide a relatively simple, inexpensive, improved method for making tubing from coated strip stock wherein the product is resistant to the corrosive effects of whatever environment the product is intended to be used in. A related object of the invention is to provide a relatively inexpensive, improved tube structure of the type under consideration which is so corrosion resistant.

In general, the invention contemplates the use of strip stock in which the substrate metal is provided with a layer of corrosion-resistant metal thick enough to afford adequate protection against the corrosive effects of the environment in which the tubing is to be used. This layer has portions adjacent its exposed surface whose melting point is lower than that of the substrate metal. These portions of the layer provide the bonding metal. In the preferred form of the invention, the metal layer comprises a cladding of the corrosion-resistant metal over the substrate in turn coated with a bonding metal having a melting point lower than those of the substrate and corrosion-resistant metals.

In accordance with the invention, the longitudinal edge portions of the strip stock are first bent to provide a laterally projecting flange which extends along each edge of the strip. Each flange is subjected to force which displaces the bare edge face of the substrate metal away from the edge of the strip with attendant folding of some portions of the flange over adjacent portions of the strip. The folded portions are then reduced in thickness at least to generally the original thickness of the strip. The edge portions, thus prepared, carry the layer of corrosion-resistant and bonding metal.

The strip stock, with its edges thus prepared, is fashioned laterally to tubular form with each prepared edge portion brought into engagement with another portion of the strip. The resulting tubular form is heated and cooled to provide a fused metal connection between the interfacing portions thereof. In the accompanying drawings:

FIG. 1 is a partly diagrammatic end view of strip stock used in the practice of this invention.

FIGS. 2-5 are diagrammatic end views illustrating four successive steps in the method of this invention.

FIG. 6 is a partly diagrammatic end view of tubing made from the strip stock.

FIG. 7 is a view similar to FIG. 1.

FIGS. 8-11 are diagrammatic end views illustrating four successive steps in the manufacture of a different type of tubing.

FIG. 12 is a fragmentary, diagrammatic end view which illustrates tubing made from the strip stock prepared as in FIG. 11.

FIG. 13 is a view similar to FIG. 12 but showing another form of tubing made from the prepared strip stock of FIG. 11.

FIG. 14 is a diagrammatic representation of apparatus suitable for making tubing in accordance with FIGS. 1-6.

FIG. 15 is a diagrammatic representation of apparatus suitable for making tubing in accordance with the modified form of the method illustrated in FIGS. 16-20.

FIG. 15A is a partly diagrammatic end view illustrating an initial step in the modified form of the method.

FIG. 16 is a fragmentary, partly diagrammatic view illustrating a step in preparing the strip stock of FIG. 19.

FIGS. 17 and 18 are views similar to FIG. 16 but showing successive steps in the method.

FIG. 19 is an enlarged, partly diagrammatic sectional view of strip stock prepared by the steps illustrated in FIGS. 16-18.

FIG. 20 is a fragmentary, partly diagrammatic end view of tubing made from the prepared strip stock of FIG. 19.

In the present disclosure and claims, the terms "cladding" and "coating" and related terms are used merely for convenience of terminology and without reference to the manner in which the metal involved is applied over underlying portions of the strip stock.

Shown in FIG. 1 is one end of a strip of stock 30 comprised of a strip of relatively corrosion-prone metal 32 such as steel having opposite faces 34 clad with a layer of corrosion-resistant metal in turn coated with a bonding metal which has a melting point lower than that of the substrate and that of the corrosion-resistant metal. This composite layer is represented generally at 36. As is brought out above, such strip stock is conventionally made by providing layers 36 on relatively wide bands of the substrate metal, these bands then being slit longitudinally to form the relatively narrower strips of stock 30. As a result of the slitting, substrate 32 has exposed edge faces 38.

For convenience of manufacture, strip stock 30 is provided in coils 40 (FIG. 14) from which it is drawn into and passed through apparatus 42 which fabricates the stock into tubing. As is brought out more in detail below, the apparatus includes a series of forming rolls 44–56 through which the stock is passed longitudinally while being edge-conditioned and fashioned to tubular form, a heating zone 58 downstream of the forming rolls in which the tubular form is heated and its bonding metal fused, and a cooling jacket 60 downstream of the heating zone in which the tubing is cooled to complete the fused metal connection. The completed tubing T, upon issuing from the cooling jacket, may be cut to desired lengths or wound into coils as required.

In the apparatus of FIG. 14, rolls 44 first bend strip stock 30 at locations adjacent its longitudinal edges to provide two flanges 62, 64 which project in generally opposite directions from the intermediate portions of the stock (FIG. 2). Next, rolls 46 fold the flanges bodily over opposite face portions of the strip body (FIG. 3) so that the bare substrate edges 38 are displaced away from the resulting edges 66 of the strip, these edges now comprising the outer surfaces of the folds which are coated with the composite coating layer as illustrated. Rolls 50 then subject the plies formed by the folds to lateral pressure, thereby reducing their combined thickness generally to that of strip stock 30 prior to the bending step of FIG. 2. The stock is now in the condition shown in FIG. 4 with the exposed substrate metal 38 distorted and facing outwardly from opposite faces of the stock. Bands 38 lie adjacent the portions of the reduced fold plies most remote from edges 66. There may be some upsetting and thickening of the composite layer at edges 66, as illustrated.

The stock is then passed through rolls 52 which bevel the edge portions to the condition illustrated in FIG. 5, preferably so that they taper in opposite directions as at 68 and 70. The resulting strip stock is everywhere covered by composite layer 36 except along the two bands 38 of exposed substrate material which extend generally parallel to edges 66.

The strip stock thus prepared is now passed through a series of forming rolls represented at 54, 56 in which the strip stock is fashioned laterally through about 720° to tubular form having a two-ply wall thickness as shown in FIG. 6. Tapered portions 68 and 70 are brought into engagement with opposite face portions of a central longitudinally extending region 72 of the strip stock. In this step, the two plies of the strip stock now forming the tube wall are brought into engagement. Thus, there are coatings of the bonding metal between all interfacing portions of the plies forming the tube wall with the exception of the regions containing bands 38 of the exposed substrate metal.

The formed tube is now passed through heating zone 58 wherein its temperature is raised to a temperature at least as high as that of the melting point of the bonding metal, thereby causing the bonding metal to fuse. Since the bonding metal has a melting point lower than that of the substrate and lower than that of the corrosion-resistant metal cladding the integrity of the substrate and corrosion-resistant metal is not affected. While the bonding metal is in fused condition, it flows by capillarity into the minute space left by the absence of the corrosion-resistant and bonding metals at bands 38.

The tubing is then passed out of the heating zone into cooling jacket 60 wherein the tubing is cooled below the melting point of the bonding metal to solidify the bonding metal and complete the fused metal connection between the inner and outer plies of the tubing wall.

The completed tubing T has an inner surface 74 and an outer surface 76, each of which is entirely covered by the protective cladding of the corrosion-resistant metal. The tube has inner and outer longitudinal seams 78 and 80 at the juncture of strip stock edges 66 and intermediate portion 72 of the stock. These seams are smooth and clean and are protected by their layers of corrosion-resistant metal cladding. Bands 38, disposed between the inner and outer plies of the tubing wall and displaced from seams 78 and 80, are isolated from the corrosive effects of any environment to which the tube might be subjected interiorly or exteriorly.

In effect, all parts of the tube are protected from corrosion by a layer of corrosion-resistant metal. Moreover, a double thickness of the corrosion-resistant metal exists between the plies of the tubing wall, since the apposed portions of the strip stock each carries a layer of the metal. Consequently, if for some reason corrosion should initiate either inside or outside of the tube, this double thickness of corrosion-resistant metal would form an effective barrier to progress of the corrosion completely through the tube wall.

It is stated above that in the thickness reduction step of the strip stock from the FIG. 3 condition to the FIG. 4 condition, the plies of the folds are reduced in combined thickness to generally the thickness of the stock before the flange-bending step. In practice, the reduced plies may in fact be slightly thicker or slightly thinner than the general body of the stock. No precise limits can be placed on the amount of this variation. The combined thickness of the plies is regarded as being substantially the same as that of the strip body in general if the combined thickness is close enough to the body thickness so that the strip is susceptible of being fashioned to a tubular form in which the interfaces secured together satisfactorily by the fused metal connection.

It will be obvious from FIG. 6 that the strip stock is not fashioned transversely through exactly 720°, since there is some overlapping of portions of the stock in the finished tube. This terminology is used to indicate that the stock is rolled generally through two complete convolutions so that the overlapping portions of the stock will form a double wall thickness throughout. The comments of this and the preceding paragraph apply equally to the modifications of the invention described below.

A specific example of strip stock 30 satisfactory for practice of the invention is one in which substrate 32 in strip form has a thickness of about .015″. The strip is clad on both sides with a layer of Monel in the range from about .0015″ to about .002″ thick, this layer providing the corrosion-resistant metal. The bonding metal comprises a coating of copper over the Monel, the copper being provided in amounts ranging from about 0.1 to about 0.2 oz. per square foot of surface area.

The step of heating the rolled tube in heating zone 58 may be accomplished under conditions such as those disclosed in Hobrock 2,373,116. It is to be noted that the melting point of the copper is about 1,985° F., which is lower than the melting point both of Monel (about 2,370° F.) and that of steel. The wall thickness of the resulting tube is about .028″, which is somewhat less than twice the thickness of the original strip stock, since there is some elongation and thickness reduction of the stock during the rolling steps indicated.

The invention has already been proven highly successful in the manufacture and use of tubing of relatively small diameter, e.g., smaller than 1″, and upon the basis of currently available information, it can be asserted that the invention will be equally successful with respect to tubing of considerably larger diameters.

Other specific examples of suitable combinations of metals for forming the tubing are as follows:

(1) Substrate, steel; corrosion-resistant metal, cupronickel; bonding metal, copper.

(2) Substrate, steel; corrosion-resistant metal, pure nickel (A nickel); bonding metal, copper.

(3) Substrate, steel; corrosion-resistant metal, copper; bonding metal, tin copper.

In the latter example, the tin copper could be replaced by any one of the several brazing metals.

While in each example the specific substrate metal is disclosed as steel, it is within the ambit of the invention to use other substrate metals so long as the essential requirement is met that the bonding metal have a melting point lower than the melting point of the substrate, and of the corrosion-resistant metal where the bonding metal is different from the corrosion-resistant metal.

It is within the invention to use a layer of a single metal over the substrate metal to provide both the bonding metal and the corrosion-resistant metal. In this case, after the strip stock has been edge-conditioned as described and fashioned laterally to tubular form, the interengaged portions of the strip could be bonded together in any one of several ways.

One way would be by the diffusion bonding process in which the tubular form would be heated to a temperature somewhat below the melting point of the layer metal and subjected to relatively great forging pressure. This could be done by passing the tubular form in heated condition over a mandrel and within pressure rolls, such apparatus being well known in the art. However, in the present state of diffusion bonding technology, only about 25 percent of the interengaged surfaces actually bond and the resulting fused metal connection would not have adequate strength to resist fluid pressures and might not be fluid tight. Thus, diffusion bonding as presently known leaves something to be desired.

Another method of forming the fused metal connection would be to heat the tubular form to the melting point of the layer metal. However, when the layer metal is present in quantities great enough to provide adequate corrosion resistance, when it is melted it tends to run and form droplets in some areas while leaving other areas of the substrate bare. Thus, in the present state of technology, this specific process would result in a product which would be partially defective in that not all areas of the substrate would be protected from corrosion.

For the reasons set forth in the two preceding paragraphs, the preferred form of the invention is to use over the substrate a cladding of the corrosion-resistant metal in turn coated with a bonding metal having a melting point lower than that of the substrate and corrosion-resistant metal.

The modification of the invention shown in FIGS. 7–13 is in general similar to that described except that in the first step flanges 62 are bent in the same direction from the general direction of extent of the strip body (FIG. 8). These flanges are then both folded over the same face of the strip (FIG. 9) and are then reduced in thickness (FIG. 10) with both bands 38 of bare metal disposed on the same face of the resulting strip. In apparatus 42, rolls 44–50 are suitably modified to so treat the strip. As before, bands 38 are disposed adjacent those portions of the folded plies most remote from edges 66 of the strip.

The strip is then beveled adjacent its edges to provide tapered portions (FIG. 11) at 68 and 70. Then the strip is rolled laterally through about 360° and tapered portions 68, 70 are brought into engagement. In this step, the direction in which the strip is rolled will depend upon whether bands 38 are to be disposed inside of the tubing (FIG. 12) or outside of the tubing (FIG. 13). In either event, the tube is heated to form a fused metal connection between the interengaged tapered portions and then cooled to complete the fused metal connection.

By means of this modification, tubing T' having a single ply wall is formed. This tubing will probably have its greatest usefulness where ability to withstand pressure is relatively insignificant and where only the inner or outer surface of the tube will be subjected to a corrosive environment.

The modification of the invention illustrated in FIGS. 15–20 is, in general, similar to that described above in that strip stock 30 is so treated as to displace the bare edge faces 38 away from the edges of the stock which will ultimately form the seam areas. In apparatus 42A (FIG. 15), stock is drawn from a coil 40 and passed through rolls 82 which form flanges 84 and 86 (FIG. 15A). The strip is then passed through a series of rolls 88, 90, 92 in which the flanges are reduced in thickness and edge faces 38 are displaced away from the edges of the stock, and the edge margins of the stock are tapered. Then the stock is passed through forming rolls 94, 96, 98 in which the stock is fashioned to tubular form. The tube is passed through heating zone 58 and cooling jacket 60 to complete tubing T''.

In the formation of flanges 84 and 86, for reasons set forth below, it is advantageous to bend the stock through an angle $a$ less than 90°; for example, in the range from about 75° to about 80°. Each of rolls 88–92 comprises a pair of gripping roll members 100, 102 which grip the flat portions of the stock between the flanges, these rolls including respectively a beveling and reducing roll 104, 106, 108. Rolls 104–108 are arranged to exert force on the flanges toward the main body of the strip and at generally the angle of the flange to the body of the strip.

These rolls are spaced progressively closer to gripping roll 102. In passing from roll 104 to roll 106, each flange is reduced in length and thickened from the condition of FIG. 16 to generally the condition illustrated in FIG. 17. At this point, a portion 110 of the flange adjacent the inner side of edge face 38 begins to upset inwardly over the body of the stock. The portion 112 of the flange outwardly of face 38 begins to upset in an outward direction.

Thereafter, this shortening and thickening continues until under the final roll 108, portion 110 has folded over an adjacent portion of the strip body while portion 112 has upset outwardly to a relatively thin edge. During this reduction and thickening, the rolls also taper the edge portions of the stock extending between fold 110 and edge 112 to provide the strip with tapered edge portions 114 and 116. The bare metal bands 38 are disposed at intermediate portions of the taper.

It will be noted that during the reduction and tapering step, the composite layer of corrosion-resistant metal and bonding metal has thickened materially adjacent the newly formed strip edges 112. Folded portion 110 and the adjacent portions of the stock define an interspace starting at the juncture 118 between the tapered portion and flat portions of the stock (FIG. 19). This interspace first extends away from juncture 118 and somewhat toward edge 112 as at 120. The interspace then returns somewhat toward its respective tapered surface 116, 114 at 122 while extending generally toward the edge 112, and finally terminates in a portion 124 curved away from the tapered surface. This interspace is filled with a double thickness of the composite layers of cladding and coating metals.

The strip shown in FIG. 19 is then fashioned to tubular form in passing through rolls 94–98. In this step, tubing of the type shown in FIG. 20 may be formed wherein the strip is fashioned transversely through about 720° so that tapered edge portions 114 and 116 are engaged against opposite face portions of a generally central region 126 of the stock. As in the FIG. 6 form of the tube, this tube has a two-ply wall throughout its extent, all interior and exterior surfaces of the tubing being clad with the corrosion-resistant metal and carrying the coating of bonding metal. The tube is then passed through the heating zone 58 to fuse the bonding metal and through cooling jacket 60 to complete tubing T".

In this tubing, the bare metal bands 38 are displaced from the inner and outer seams 128, 130 and are disposed between intermediate region 126 and tapered portions 114, 116. Here again, in the heating step, the fused bonding metal flows by capillarity into the minute pockets existing between the plies at bands 38.

Alternatively, the prepared strip of FIG. 19 can be fashioned through about 360° to form a tube (not shown) having a single-ply wall; and in this case, tapered edges 114 and 116 would be interengaged in the manner of tapered edges 68 and 70 (FIG. 12 or 13). Bare metal bands 38 would be apposed, but here again, the resulting pocket would be filled by the bonding metal by capillarity during the heating step. This tube has the advantage over the tubes of FIGS. 12 and 13 that all internal and external surfaces of the tube are completely protected by the layer of corrosion-resistant metal.

Flanges 84, 86 are illustrated as being bent to an angle of less than 90°, since at present, it is believed that this step, in combination with the step of exerting the thickness reduction force at such an angle, provides the greatest likelihood of reliability displacing metal edge faces 38 inwardly away from the edges of the strip stock. In this regard, it is to be noted that tubing of the type contemplated herein will be formed in the rolling mill at the rate of about 400 ft. per minute so that reliability is an important factor. However, it is within the ambit of the invention to bend flanges 84 and 86 through any angle and exert shortening and thickening force thereon at any angle which will effectively shift bare metal 38 away from the strip edge and reduce the edge portions to at least the general thickness of the strip body.

I claim:
1. The method of making tube which comprises,
providing a metal strip which includes a corrosion-prone metal substrate having surface portions clad with a layer of metal,
said layer being corrosion resistant and at least the portions thereof adjacent its exposed surface having a melting point lower than that of said substrate, said layer portions providing bonding metal,
said substrate having along each longitudinal edge an edge face, the metal of which is exposed,
bending clad portions of said strip generally adjacent each longitudinal edge thereof to form a longitudinally extending lateral flange, the distal end of which contains said edge face,
subjecting each of said flanges to force of such magnitude and direction that the metal containing said edge face thereof is displaced away from the edge of the strip and over adjacent portions thereof,
subjecting the displaced metal and said adjacent portions of said strip to further force of such magnitude and direction as to reduce the combined thickness thereof to a maximum not substantially greater than the thickness of said strip prior to said bending step, and thereby providing said strip with prepared longitudinal edge portions which are so clad and which are free of said exposed metal,
fashioning said strip laterally to tubular form having an inner surface and an outer surface, at least one of which is free of said exposed metal,
engaging each of said prepared edge portions against another portion of said strip and thereby defining a longitudinal seam free of said exposed metal,
heating the interengaged portions of said strip to a temperature at which said bonding metal thereon fuses and thereby causing a fused metal connection to form therebetween, and then cooling said interengaged portions below said temperature.

2. The method defined in claim 1 wherein in the step of subjecting said flanges to force, said flanges are folded bodily over said adjacent portions of said strip so that each edge face is disposed away from its respective fold and the resulting outer surfaces of the folds are so clad.

3. The method defined in claim 2 wherein after said thickness reduction step portions of said strip adjacent the resulting edges are subjected to additional force of such a direction and magnitude that the same are tapered in thickness toward said edges, thereby providing said prepared longitudinal edge portions.

4. The method defined in claim 1 wherein said force is exerted against each of said flanges in a direction toward said strip, thereby shortening and thickening said flanges,
said further force also being exerted generally in said direction so that in said thickness reduction step a portion of the metal of each flange adjacent one side of said edge face folds over an adjacent portion of said strip and a portion of the metal of the flange adjacent the other side of said edge face upsets outwardly of said adjacent strip portions.

5. The method defined in claim 4 wherein said strip is bent through an angle of other than 90° to form each of said flanges, said force and further force being exerted generally at the angle of each flange to said strip.

6. The method defined in claim 5 wherein said angle is less than 90°.

7. The method defined in claim 6 wherein said angle is in the range from about 75° to about 80°.

8. The method defined in claim 4 wherein said strip is bent through an angle of less than 90° to form each of said flanges, said force and further force being exerted generally at the angle of each of said flanges to said strip, said further force being continued so that the metal of said flange is tapered in an outward direction with attendant thickening of said layer adjacent the resulting extreme edge of said strip.

9. The method defined in claim 1 wherein said strip is bent so that said flanges extend generally in opposite directions from the direction of extent of said strip,
said force being exerted in such directions as to displace the metal of said flanges over opposite face portions of said strip,
said strip being fashioned laterally through about 720°, said prepared edge portions being engaged against opposite face portions of a generally central region of said strip, thereby providing said tubular form with a wall having two plies between which said exposed metal of each of said edge faces is disposed.

10. The method defined in claim 1 wherein said strip is so bent and said force is so applied that said flanges are bodily folded over adjacent portions of the same face of said strip, said strip being fashioned laterally through about 360° to provide said tubular form with a single ply wall, the metal containing both of said edge faces being disposed on one of said inner and outer surfaces of said tubular form.

11. The method defined in claim 4 wherein said strip is so bent and said force and further force are so exerted that said prepared longitudinal edge portions are disposed adjacent opposite faces of said strip.

12. The method defined in claim 11 wherein said strip is fashioned through about 720°, said prepared edge portions being engaged against opposite face portions of a generally central region of said strip, thereby providing said tubular form with a wall having two plies between which said exposed metal of each of said edge faces is disposed.

13. The method defined in claim 11 wherein said strip is fashioned laterally through about 360° and said prepared edge portions are interengaged with said exposed metal of said edge faces disposed.

14. The method defined in claim 1 wherein said layer comprises a cladding of corrosion-resistant metal on said substrate in turn having a coating of another metal which provides said bonding metal, said bonding metal having a melting point lower than that of said corrosion-resistant metal.

15. The method defined in claim 14 wherein said substrate has opposite face portions, both of which are so clad and coated substantially throughout their entirety,
said strip being so bent and said force being so exerted as to displace the metal of said flanges over opposite face portions of said strip,
said strip being fashioned laterally through about 720°, and said prepared edge portions being engaged against opposite face portions of a generally central region of said strip, whereby to provide said tubular form with a wall having two plies between which said exposed metal of each of said edge faces is disposed,
said bonding metal being capable in fused condition of forming a bond with said substrate metal, said tubular form being subjected to said heat so that said fused metal connection forms substantially between all portions of the interfacing wall plies.

16. The method defined in claim 14 wherein said substrate comprises a ferrous metal, said corrosion-resistant metal being selected from the group consisting of nickel, cupro-nickel, and Monel, said bonding metal comprising copper.

17. The method defined in claim 16 wherein said corrosion-resistant metal comprises nickel.

18. The method defined in claim 16 wherein said corrosion-resistant metal comprises cupro-nickel.

19. The method defined in claim 16 wherein said corrosion-resistant metal comprises Monel.

20. The method in claim 19 wherein said Monel has a thickness in the range from about .0015" to about .002", the quantity of said copper being in the range from about .10 oz. to about .20 oz. per square foot of surface of said strip.

21. The method defined in claim 14 wherein said substrate comprises a ferrous metal, said corrosion-resistant metal comprises copper, and said bonding metal comprises tin copper.

22. The method of making tube which comprises,
providing a metal strip which includes a steel substrate having opposite faces substantially entirely clad with a layer of corrosion-resistant metal in turn substantially entirely coated with a bonding metal having a melting point lower than that of said substrate and corrosion-resistant metal,
said substrate having along each longitudinal edge an edge face the metal of which is exposed,
bending said strip generally adjacent each longitudinal edge thereof to form lateral flanges which project generally in opposite directions from the direction of extent of intermediate portions of said strip, the distal ends of said flanges containing said edge faces,
subjecting said flanges to force of such magnitude and direction as to fold them bodily over adjacent portions of opposite faces of said strip,
subjecting said flanges and adjacent portions to further force of such magnitude and direction as to reduce the combined thickness thereof to approximately the thickness of said strip prior to said bending step,
subjecting edge portions of said strip so reduced in thickness to additional force of such magnitude and direction as to taper the same in an outward direction, and thereby providing said strip with prepared longitudinal edge portions,
fashioning said strip laterally through about 720° and engaging said prepared edge portions against opposite faces of an intermediate region of said strip, and thereby forming a tube having a wall with plural plies which are interengaged and in which the exposed metal of said edge faces is displaced from the resulting seams and disposed between the interfacing plies,
heating said tube to at least the melting point of said bonding metal, and thereby causing a fused metal connection to form between interfacing portions of said strip,
and then cooling said tube so solidify said fused metal connection.

23. The method of making tube which comprises,
providing a metal strip which includes a steel substrate having opposite face portions substantially entirely clad with a layer of corrosion-resistant metal in turn substantially entirely coated with a bonding metal having a melting point lower than that of said substrate and corrosion-resistant metal,
said substrate having along each longitudinal edge an edge face, the metal of which is exposed,
bending said strip generally adjacent each longitudinal edge thereof through an angle in the range from about 75° to about 80° to form flanges which project in generally opposite directions from the direction of extent of intermediate portions of said strip,
subjecting each of said flanges to force exerted generally at the angle of the respective flange to the strip and thereby shortening and thickening each flange,
continuing the application of said force so that a portion of the metal of each flange adjacent one side of said edge face folds over adjacent portions of said strip and a portion of the metal of the flange adjacent the other side of said edge face upsets outwardly of said adjacent strip portion,
further continuing said force so that the metal of said flange is tapered outwardly with an attendant thickening of said cladding and coating adjacent the resulting extreme edge of said strip,
the metal of said edge face being disposed within the resulting tapered edge portion of said strip,
fashioning said strip laterally through about 720° and engaging said tapered edge portions against opposite faces of an intermediate region of said strip and thereby forming a tube having a wall with plural plies which are interengaged and in which the exposed metal of said edge portions is displaced from the resulting seams and disposed between the interfacing tapered portions and intermediate region,
heating said tube at least to the melting point of said bonding metal and thereby causing a fused metal connection to form between the interfacing portions of said strip,
and then cooling said tube to solidify said fused metal connection.

24. Tubing which comprises,
a metal strip which includes a corrosion-prone metal substrate clad with a layer of other metal,
said layer being corrosion resistant, and at least the portions thereof distal of the underlying substrate having a melting point lower than that of said substrate, said layer portions providing bonding metal,
said strip having, generally parallel to each longitudinal edge, portions so clad folded upon themselves,
said strip having a band of said corrosion-prone metal generally parallel to and spaced from each of said edges which is free of said layer,
said strip being shaped laterally to hollow form with clad portions thereof adjacent each of said edges engaged against another portion of said strip so that a tube is thereby defined having an outer surface and an inner surface, each with a seam,
said bonding metal between the interengaged portions of said strip being fused and thereby forming a fused metal connection therebetween,
said bands of metal being spaced from said seams so that said seams are corrosion resistant.

25. The tubing defined in claim 24 wherein said folded portions have a combined thickness substantially no greater than that of said strip between said folded portions.

26. The tubing defined in claim 24 wherein said bands

27. The tubing defined in claim 24 wherein said strip has portions of tapered thickness between said folded portions and each edge.

28. The tubing defined in claim 27 wherein said bands of corrosion-prone metal are disposed without said tapered portions.

29. The tubing defined in claim 27 wherein said bands of corrosion-prone metal are disposed within said tapered portions.

30. The tubing defined in claim 27 wherein at least portions of said folded portions are disposed without said tapered portions.

31. The tubing defined in claim 27 wherein said folded portions substantially in their entirety are disposed within said tapered portions.

32. The tubing defined in claim 31 wherein the interspace defined by each of said folded portions extends first away from a location adjacent the juncture of its respective tapered portion and adjacent portions of said strip and toward its respective edge, then while extending toward said edge, returns toward its respective tapered surface and then turns away from said tapered surface.

33. The tubing defined in claim 24 wherein said strip is fashioned through about 720° and said portions adjacent said edges are engaged against opposite face portions of a generally central region of said strip so that said tubing has a wall with plural plies between which said bands of corrosion-prone metal are disposed.

34. The tubing defined in claim 33 wherein said bands are disposed between said portions adjacent said edges and the central region of the strip engaged thereby.

35. The tubing defined in claim 33 wherein said bands are displaced from said portions adjacent said edges and the central region of the strip engaged thereby.

36. The tubing defined in claim 33 wherein said portions adjacent said edges extend between said edges and folded portions and have tapered thickness.

37. The tubing defined in claim 36 wherein said bands are disposed between said tapered portions and the central region of the strip engaged thereby.

38. The tubing defined in claim 36 wherein said bands are displaced from said tapered portions.

39. The tubing defined in claim 24 wherein said strip is shaped through about 360° and said portions adjacent said edges are interengaged, said bands being displaced from the interengaged portions, and both being disposed on the same one of said inner and outer surfaces.

40. The tubing defined in claim 24 wherein said strip is shaped through about 360°, said portions adjacent said edges being interengaged, and said bands being disposed within the interengaged portions.

41. The tubing defined in claim 24 wherein said portions adjacent said edges extend between said folded portions and edges and have tapered thickness, said strip being shaped through about 360°, said portions of tapered thickness being interengaged.

42. The tubing defined in claim 24 wherein said layer comprises a cladding of corrosion-resistant metal on said substrate in turn having a coating of another metal which provides said bonding metal, said bonding metal having a melting point lower than that of said corrosion-resistant metal.

43. The tubing defined in claim 42 wherein said substrate comprises a ferrous metal, said corrosion-resistant metal being selected from the group consisting of nickel, cupro-nickel, and Monel, said bonding metal comprising copper.

44. The tubing defined in claim 43 wherein said corrosion-resistant metal comprises nickel.

45. The tubing defined in claim 43 wherein said corrosion-resistant metal comprises cupro-nickel.

46. The tubing defined in claim 43 wherein said corrosion-resistant metal comprises Monel.

47. The tubing defined in claim 46 wherein said Monel has a thickness in the range from about .0015″ to about .002″, the quantity of said copper being in the range from about .10 oz. to about .20 oz. per square foot of surface of said strip.

48. The tubing defined in claim 42 wherein said substrate comprises a ferrous metal, said corrosion-resistant metal comprises copper, and said bonding metal comprises tin copper.

References Cited

UNITED STATES PATENTS

| | | | |
|---|---|---|---|
| 1,318,809 | 10/1919 | Sharp | 220—75 |
| 1,930,191 | 10/1933 | Bundy | 138—171 X |
| 2,014,983 | 9/1935 | Quarnstrom | 138—171 X |
| 2,380,107 | 7/1945 | Hobrock | 138—171 |
| 2,730,135 | 1/1956 | Wallace | 138—171 |
| 2,866,480 | 12/1958 | Snively | 138—171 |

ALFRED R. GUEST, *Primary Examiner.*

U.S. Cl. X.R.

29—477; 113—120; 220—75